UNITED STATES PATENT OFFICE.

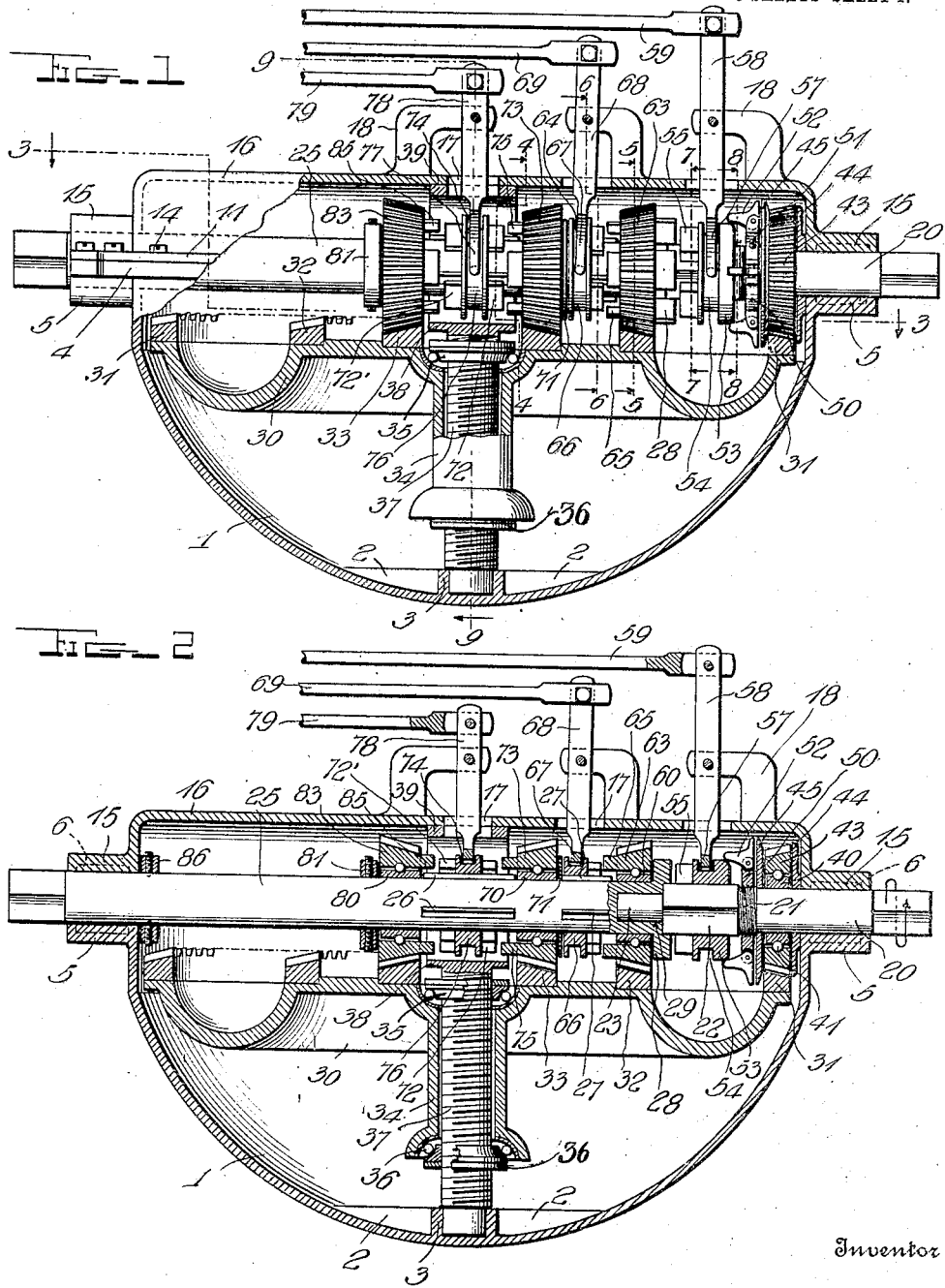

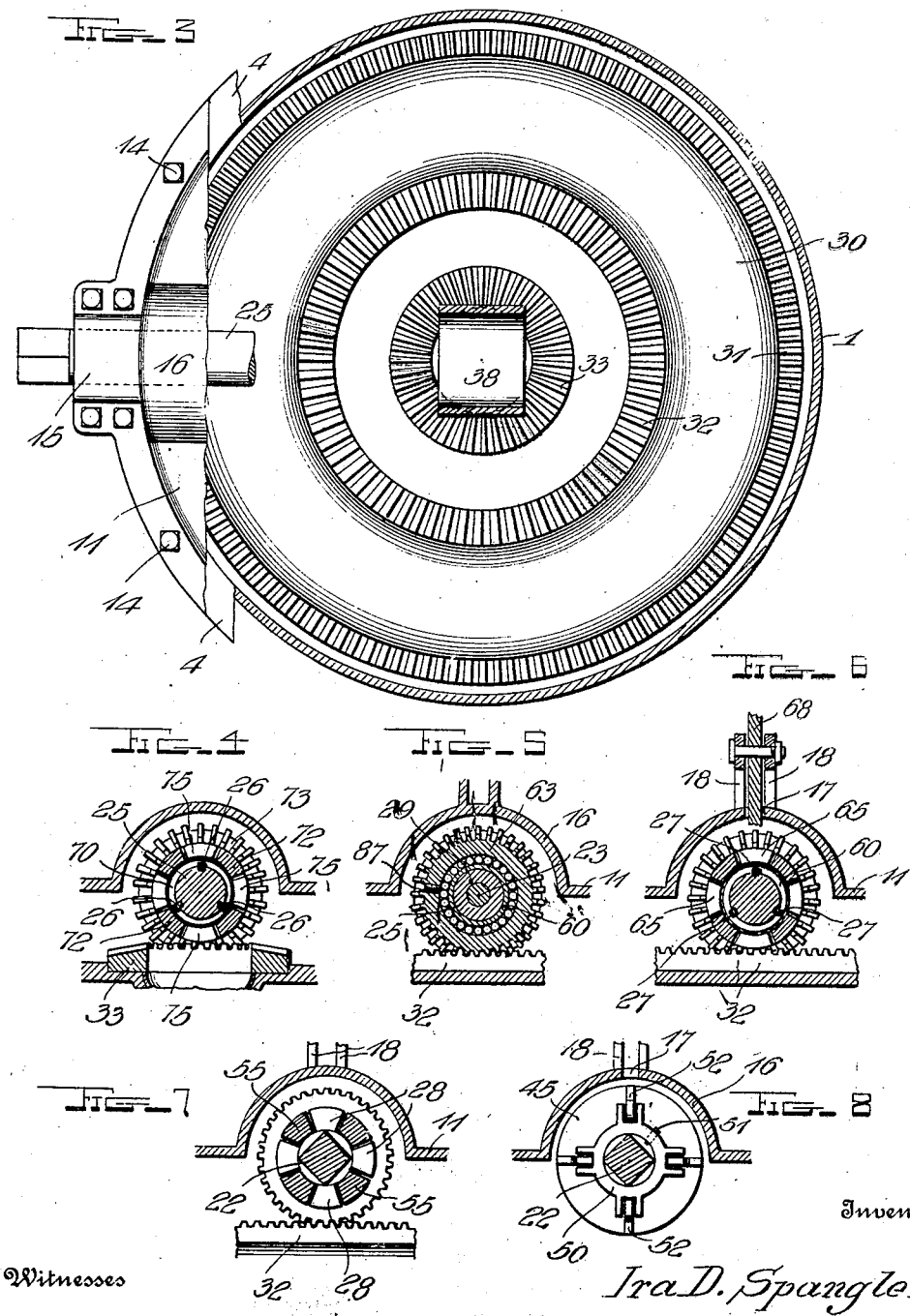

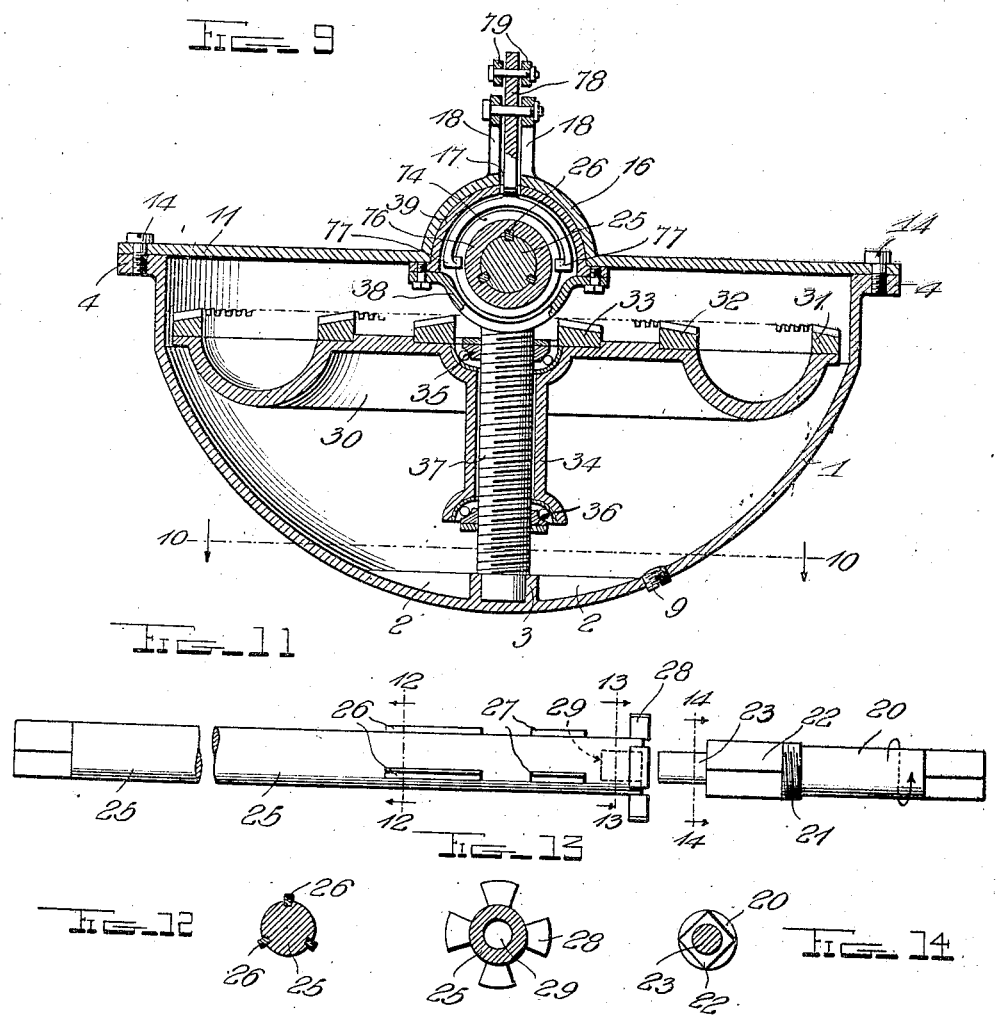
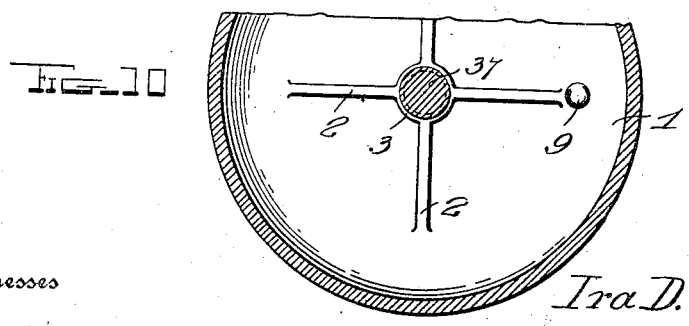

IRA D. SPANGLER, OF SALIDA, COLORADO.

TRANSMISSION MECHANISM.

1,100,924.

Specification of Letters Patent.   Patented June 23, 1914.

Application filed April 21, 1913.   Serial No. 762,678.

*To all whom it may concern:*

Be it known that I, IRA D. SPANGLER, a citizen of the United States, residing at Salida, in the county of Chaffee and State of Colorado, have invented certain new and useful Improvements in Transmission Mechanism; and I do declare the following to be a full, clear, and exact description of the invention, such as will enable others skilled in the art to which it appertains to make and use the same.

This invention relates to machine elements, and more especially to gearing; and the object of the same is to produce an improved transmission mechanism for use in automobiles and the like (although I do not wish to be confined to this use of the same) in such manner that all parts thereof are readily accessible and may be disconnected, inspected and repaired, and reassembled with ease. This and other objects are carried out by constructing the transmission mechanism in the manner hereinafter more fully described and claimed, and as shown in the drawings wherein—

Figure 1 is a side elevation of this mechanism complete, the casing being in section; and Fig. 2 is a central longitudinal sectional view of the entire mechanism and casing. Fig. 3 is a plan view with the top of the casing and all parts above the master gear broken away, taken on about the line 3—3 of Fig. 1. Figs. 4 and 8 inclusive are sectional details on the lines 4—4, 5—5, 6—6, 7—7, and 8—8 respectively of Fig. 1. Fig. 9 is a cross section taken on the line 9—9 of Fig. 1; and Fig. 10 is a horizontal section on the line 10—10 of Fig. 9. Fig. 11 is an elevation in detail of the shaft sections slightly separated; and Figs. 12, 13 and 14 are cross sectional details on the lines 12—12, 13—13, and 14—14 respectively of Fig. 11.

The casing in the present instance will doubtless be constructed of aluminum or other light but substantial sheet metal, and in contour it will simulate the lower half of a sphere as indicated. Its lower or cupped portion 1 will have internal crossed webs 2 intersecting a central socket 3, and around the open upper end of this portion or member will be formed a radial flange 4 suitably dished at opposite points as shown at 5 to contain bearings 6 as indicated in dotted lines in Fig. 2, although these bearings form no part of the present invention. The upper portion or top 11 of this casing will by preference be flat or nearly so, and at its edge it will overlie the flange 4 to which it may be screwed or bolted as at 14, its edge also being provided with curved enlargements 15 above the bearings 6 as seen in Fig. 2. I have not considered it necessary to illustrate and describe the supports for the casing, but if this transmission mechanism is employed in an automobile or motor vehicle said casing will be rigidly but removably carried by the chassis as well understood. Across the otherwise flat top 11 is formed an arch 16 slotted in its crown at several points as at 17, and rising from the arch and extending over each slot is a bracket 18 for a purpose yet to appear. The mechanism within the casing may be oiled through these slots or other openings not shown, and surplus oil or grease within the casing may be drawn off through a vent opening closed by a plug 9 as seen in Fig. 9. The shaft sections carrying the connections with the power and the connections with the driven elements (not shown) are disposed end to end and extend through this casing within said arch 16, the sections being themselves mounted within the bearings 6 if any are employed. The power shaft section 20 by preference I make rather short as seen at the right end of Fig. 11, and at about the mid-length of its body I provide it with external threads 21, next inside of which is a squared portion 22, and next inside of which the shaft is somewhat reduced and rounded in the form of a stub shaft 23. The driven shaft section 25 is rather longer as shown at the left of this view, its body being provided with two sets of feathers or splines 26 and 27, its inner end enlarged into a toothed head 28, and its inner extremity having a cylindrical socket 29 in which the stub 23 of the other shaft section rotates freely when the two sections are in place. In the present case we will assume that the power shaft section 20 rotates in the direction of the arrows applied thereto in Figs. 2 and 11, and it is the purpose of this transmission mechanism to communicate such rotation to the driven shaft section 25 at various speeds.

When this device is used on an automobile high speed or direct drive is accomplished, as usual, by connecting the shaft sections directly to each other, intermediate and low speed are secured by connecting the power shaft 20 with the other shaft through the instrumentality of gearing, and low speed in a reverse direction is brought about in the same manner excepting that one additional gear is interposed in the train employed. Excepting on direct drive, I make use of a master gear 30 carrying three rings of teeth, 31, 32, and 33, as seen in Fig. 3, and in order to give this master gear great rigidity I provide it with an integral and rather long depending hub 34 which is supported by adjustable ball bearing rings 35 and 36 screwed on a screw threaded post 37 whose lower end is seated in said socket 3 and whose upper end carries the lower part 38 of a two-part eye whose upper part 39 is disposed beneath the center of the arch 16 as best seen in Figs. 1 and 2. This arrangement gives great stability to the upper end of the post, whose lower end is of course braced by the webs 2 which hold the socket 3, and when the long hub 34 is supported by two ball bearings 35 and 36 on said post, the master gear will be firmly supported within the casing, although it can be adjusted to take up wear by setting the cone-members of said ball bearings in a manner which is well understood.

The power pinion is mounted on the power shaft 20, and I may here say that the several pinions yet to be described are constructed in substantially the same manner as this one. A collar 40 shrunk on or otherwise secured to the shaft is provided with an annular groove for a series of balls 41, and around these is disposed the annular body 43 of the pinion which is internally grooved to receive said balls and externally toothed as shown at the right of Fig. 2—the teeth being preferably inclined slightly so as to engage the outer ring 31 of teeth on the master gear. A thrust bearing or collar 44 is by preference secured to the shaft adjacent the larger end of said body to prevent the disengagement of its teeth with those in the ring 31. Between the smaller end of said body and the threads 21 is by preference disposed a rather large washer or disk 45, and in fact these disks and felt dust washers may be employed throughout the mechanism wherever considered advisable. A clutch is employed for connecting the body of this power pinion with the power shaft so that the rotation of the latter will rotate the former and the master gear for a purpose yet to be set forth, but when this clutch is not thrown in the rotation of the power shaft carries the collar 40 with it and these parts run idly within the body 43 whose teeth remain constantly engaged with the ring 31. This clutch may be of any suitable type, but as the most convenient and compact, and withal the most accessible, I prefer to construct it as follows: An internally threaded collar 50 is adjusted onto the threaded portion 21 of the shaft 20, and possibly held in adjusted position by means of a set screw 51, and pivoted in notches in the periphery of this collar are a series of dogs 52 whereof each is in the shape of a bell-crank lever pivoted at its angle and with one arm bearing against the disk 45 while the other arm stands substantially parallel with the axis of the shaft. Slidably mounted on the squared portion 22 of the latter is a spreader in the form of a cone 53 which when moved longitudinally will distend the last-named arms of said dogs with the result that the radial arms will press the disk toward and into contact with the body 43 of the power pinion. The body of the cone 53 is provided with an annular groove 54 loosely engaged by a fork 57 at the lower end of a lever 58 which rises through one of the slots 17 in the arch 16 and is pivoted in the bracket 18 directly above said slot, the upper end of this lever being connected by suitable means such as a rod 59 with the clutch-operating mechanism not shown. When the latter is actuated to move the cone to the right as seen in Fig. 2, it is obvious that the dogs are thrown with more or less force into contact with the disk 45, and the latter is pressed against the power gear so that the action is substantially that of the well-known disk clutch now commonly employed in automobiles. The opposite or inner end of said cone is provided with teeth 55 whereby it becomes in effect a clutch element, and these teeth are so shaped that they will engage with the toothed head 28 on the inner end of the driven shaft 25, whereby said head becomes in effect the other clutch element. Thus the movement of the lever 58 in one direction opens the disk clutch and engages that just described so that the power shaft rotates the driven shaft at high speed on direct drive, whereas the movement of the lever 58 in the opposite direction disengages these clutch elements and closes the disk clutch so that the rotation of the power shaft and its pinion causes the rotation of the master gear with a result yet to be explained.

A collar 60 is shrunk on or otherwise secured to the driven shaft just inside its head 28 which acts as a thrust bearing or collar for the intermediate speed pinion, and the annular body 63 of the latter is rotatably mounted on said collar 60 in the manner above described—its teeth being preferably inclined and constantly in engagement with the second ring 32 of teeth in the master gear; and the smaller end of this gear is provided with axially projecting teeth 65 so that in effect it becomes one element of a clutch. The other element 66 of this clutch is internally grooved so that it may slide longitudinally on the feathers 27, and externally provided with an annular groove 64 loosely engaged by a fork 67 at the lower end of a lever 68 which rises through one of the slots 17 in the arch 16 and is pivoted in the bracket 18 directly above said slot. The upper end of this lever is connected by any suitable means such as a rod 69 with the transmission-operating mechanism (not shown), and it will be obvious that when the latter is actuated to move the element 66 into engagement with the gear 63, the rotation of the latter by the master gear will cause the rotation of the driven shaft 25.

A collar 70 is shrunk on or otherwise secured to the driven shaft between the feathers 26 and 27, and between the latter and the collar is disposed a washer or other element constituting a thrust bearing 71. Rotatably mounted around this collar is the body 73 of the low-speed gear whose teeth are beveled to engage the innermost ring 33 of teeth on the master gear; and whose smaller end has axially projecting teeth 75 whereby it becomes one element of a clutch. The other element 76 of this clutch is internally grooved and slidably mounted on the feathers 26, and is provided with an annular groove 74 loosely engaged by a fork 77 at the lower end of a lever 78 which rises through one of the slots 17 in the arch 16 and is pivoted in the bracket directly above said slots. The upper end of this lever is connected by any suitable means such as the rod 79 with the transmission operating mechanism not shown. When the latter is actuated to move this clutch element to the right, its teeth engage those on the smaller end of said gear 73 so that the rotation of the latter by the master gear is imparted through this clutch to the driven shaft 25 which is rotated at low speed. When said operating mechanism is actuated to move the lever to an intermediate or "neutral" position as seen in Fig. 2, the clutch element is disengaged from the teeth on the gear in a manner well understood by those familiar with these mechanisms.

A collar 80 is shrunk on or otherwise secured to the driven shaft 25 at the opposite end of the feathers 26, and to the left of this collar is disposed a washer or other element constituting a thrust bearing 81. Rotatably mounted around the collar 80 is the body 83 of the reverse gear whose teeth are beveled to engage the innermost ring 33 of teeth on the master gear, on the opposite side of the hub of the latter from the point where the low speed gear 73 engages said ring. The smaller or inner end of the gear 83 has axially projecting teeth 85 whereby it becomes in effect one element of a clutch, and the other or left-hand end of the other clutch element 76 above described has teeth 72' at its left end (similar to the teeth 72 at its right end) to engage this reverse pinion when such clutch element is moved to the left of the position shown in Fig. 2 by the transmission-operating mechanism in the manner above described. For holding the shaft section 25 against movement to the left I provide it at suitable points with a thrust bearing 86. As seen in Fig. 5, each pinion body may be provided with a radial hole closed by a plug 87, and through this hole the balls may be inserted or removed.

The operation of this improved transmission device will now be as follows: With the parts standing as seen in Fig. 2 and the power driving the shaft section 20 in the direction of the arrow, the collar 40 of the driving pinion will rotate with the shaft, as also the collar 50 of the clutch mechanism, because said collars are fast thereon, and the cone member 53 will rotate with this shaft section because it is mounted on the squared portion thereof; but the master gear will not be rotated because the toothed portion 43 of the driving pinion (which is in constant mesh with the other ring 31 of teeth on the master gear) is not now revolving. To produce low speed in a reverse direction, the central clutch element is moved into engagement with the pinion 83 which engages the smallest ring 33 of teeth within the master gear, and then the lever 58 is moved to close the disk clutch by projecting the cone to the right and spreading its dogs 52; and this causes the locking of the toothed ring 43 to the body or collar 40 of the driving pinion so that the rotation of the latter is transmitted to the former and by it to the master gear, and the master gear in turn transmits power through its small ring of teeth 33 to the pinion 83 and the latter rotates the driven shaft section 25 in a direction opposite to that of the arrow at the right end of Fig. 2. To produce low speed in a forward direction, the central clutch section is moved to the right instead of to the left, and then the disk clutch is closed as above described and power is transmitted from the power pinion through the outer ring 31 of teeth on the master gear to the same inner ring of teeth 33 thereof, but on the opposite side of the hub; with the result that the shaft section 25 is rotated in the same direction as the shaft section 20 but at a slower speed. Assuming that the parts are rotating as has just been described and that it is the wish to go on to the next or intermediate speed—this is brought about by opening the disk or main clutch, then disconnecting the central clutch from the pinion 73 and engaging the right hand clutch with the pinion 63, and finally reëngaging the main clutch; and thereafter rotation of the power shaft section 20 will cause rotation of the driven shaft section 25 in the same direction as the arrow and at a slightly greater speed than formerly but yet not so fast as the driving shaft section 20 revolves. Assuming now that it is desired to go onto high speed—this is accomplished by again opening the main clutch, then disengaging the right hand clutch member from the pinion 63, and then actuating the lever 58 to move the cone member 53 to the left from a neutral position until its teeth 55 engage the toothed head 28 of the driven shaft 25. It will obviously not now be necessary to reengage the main clutch, because the driving shaft section is directly coupled to or connected with the driven shaft section 25 and the latter is rotated at the same speed as and in corresponding direction with the former. Provision will doubtless be made, as usual on automobiles and motor vehicles, for preventing the movement of one lever until the other has first been set at "neutral," but this detail need not be amplified.

For taking down the mechanism above described, the rods will first be disconnected from their levers and the latter from their brackets, then the bolts or rivets 14 will be withdrawn and the entire top 11 lifted off, and finally the upper part 39 of the eye at the top of the post 37 will be disconnected from its lower part 38—this exposes all parts of the mechanism to view and gives the operator access to them for cleaning and repair. By uncoupling or detaching the shaft section 20 from its connection with the engine and the shaft section 25 from its connection with the driven element or machine, the entire shaft (with its bearings 6 if there be any) may now be lifted out of the lower part 10 of the casing, as the teeth of the various pinions will disengage the teeth in the master gear. The shaft section 20 can now be withdrawn from the shaft section 25 by merely pulling its stub 23 out of the socket 29, and thereafter the cone member can be slipped off of the squared portion 22, the collar which carries the dogs 52 unscrewed from its threaded portion 21, the thrust bearing or collar 44 removed and the balls run out of the driving pinion and even its toothed body 43 drawn off its collar 40 in case either is to be repaired or replaced. The thrust bearings 86 and 81 may now be slipped off of the shaft section 25, and the balls removed and the toothed ring 83 of the reverse gear taken out of place in a similar manner; after which the intermediate clutch element can be slipped off the feathers 26 and removed; and thereafter the balls can be run out of the low speed pinion and its toothed ring removed in the same manner by passing it over the feathers 26. This leaves only the right hand clutch member and the intermediate speed pinion in place on the shaft section 25. However, I have stated above that the various collars are shrunken on or otherwise secured to said shaft section, and the same is true of the feathers. If these parts are removable in any manner, the same course may be followed in taking off the right-hand clutch element and the intermediate gear 63, and in fact the collars of the various gears could in that case be removed from the shaft if desired. While this shaft is out of place, it is obvious that by first lifting the entire master gear and post 37 out of the socket 30, and then running the cone 36 of the lower bearing off the lower end of said post, the master gear and its hub 34 can be removed therefrom entirely as for inspection and repair. I might suggest that in case a tooth or a few teeth in any of the rings in this gear become defective, it is quite possible to saw out a segment or a section of the ring in question and replace it with another containing perfect teeth. The parts are replaced by a reversal of the operation above described, and the entire mechanism is susceptible of alteration in detail and amplification in its parts without departing from the principle of the invention.

I do not wish to be limited to the proportions or materials, nor to the precise construction set forth above.

What is claimed is;

1. In a mechanism of the class described, the combination of driving and driven shafts, a series of pinions on the driven shaft, clutch devices for the latter, a stationary upright post at right angles to the driven shaft and having the intermediate portion of its body screw threaded, a master gear having a series of toothed rings to co-act with said pinions and a hub to slide freely on said threaded post, upper and lower bearing members co-acting with the hub of the master gear and adjustable lengthwise on the threaded portion of the post for adjusting the master gear toward and from said pinions, and means for driving the master gear from the driving shaft.

2. In a mechanism of the class described, the combination with alined driving and driven shaft sections, a driving pinion on the former, several driven pinions loose on the driven shaft, and clutch mechanisms for locking them independently to it; of an upright post beneath the driven shaft, a master gear having several rings of teeth, its hub journaled on said post, a casing having a socket in which the lower end of said post is mounted and carrying bearings for said shaft sections, the upper end of the post having a two-part eye, and a cover removably secured upon said casing and having a transverse arch overlying said mechanism and eye and enlargements at the ends of the arch overlying said bearings.

3. In a mechanism of the class described, the combination with alined driving and driven shaft sections, a driving pinion on the former, several driven pinions loose on the driven shaft, and clutch mechanisms for locking them independently to it; of an upright post beneath the driven shaft, a master gear having several rings of teeth, the gear having a long hub journaled on said post, a casing having a socket in which the lower end of said post is mounted and carrying bearings for said shaft sections, said post being threaded and carrying a two-part eye at its upper end, bearings adjustable on the post above and below said hub, means for detachably connecting the upper part with the lower whereby the eye surrounds said shaft, a cover detachably secured upon the casing and having a transverse arch overlying said shaft and the elements thereon and closely fitting over the upper part of the eye, the arch being slotted along its crown, brackets rising from said arch, and levers pivoted in the brackets and projecting through the slots into engagement with said clutch mechanisms, for the purpose set forth.

4. In a mechanism of the class described, the combination with alined driving and driven shaft sections, a driving pinion loose on the former and several pinions loose on the latter, clutch mechanisms for locking the driven pinions independently to the driven section, and a master gear rotating in a plane parallel with the axes of said sections and having rings of teeth engaging all said pinions; of a clutch element on the inner end of the driven shaft section, clutch mechanism for locking the driving pinion to the driving shaft section, a member disposed on and rotated by this section between its pinion and said element, said member having a clutch element on one end, and means for moving the element in either direction, for the purpose set forth.

5. In a mechanism of the class described, the combination with alined driving and driven shaft sections, a driving pinion loose on the former and several pinions loose on the latter, clutch mechanisms for locking the driven pinions independently to the driven section, and a master gear rotating in a plane parallel with the axes of said sections and having rings of teeth engaging all said pinions; of a toothed head on the inner end of the driven shaft section, the contiguous portion of the driving shaft section being squared, a member having a square bore slidably mounted thereon and provided with teeth adapted to engage those on said head by moving this member in one direction, and a clutch for locking the driving pinion to its shaft section, said clutch being closed by the movement of said member in the other direction.

6. In a mechanism of the class described, the combination with alined driving and driven shaft sections, a driving pinion loose on the former and several pinions loose on the latter, clutch mechanisms for locking the driven pinions independently to the driven section, and a master gear rotating in a plane parallel with the axes of said sections and having rings of teeth engaging all said pinions; of a toothed head on the inner end of the driven shaft section, the contiguous portion of the driving shaft section being squared, a member having a square bore slidably mounted thereon and provided with teeth at one end and a cone at the other end, means for moving this member in either direction, and a clutch for locking the driving pinion to its shaft section, the clutch including dogs whose inner arms are adapted to be distended by said cone.

7. In a mechanism of the class described, the combination with a master gear having a series of toothed rings, a driven shaft section extending part way across said gear and having a toothed head and a socket in its extremity, several driven pinions loose on this section and engaging said toothed rings, and means for locking them independently to this section; of a driving shaft section alined with the other section and having a stub at its extremity journaled in said socket, a squared portion next said stub and a threaded portion next said squared portion, a driving pinion loose on this section beyond the threads thereof, a thrust bearing beyond said pinion, clutch mechanism adjustably mounted on said threads, a member slidably mounted on said squared portion and having teeth at one end adapted to engage those in the head and means at its other end for closing said clutch, and means for adjusting the position of this member.

8. In a mechanism of the class described, the combination with a master gear having a series of toothed rings, a driven shaft section extending part way across said gear and having a toothed head, and a socket in its extremity, several driven pinions loose on this section and engaging said toothed rings, and means for locking them independently to this section; of a driving shaft section alined with the other section and having a stub at its extremity journaled in said socket, a squared portion next said stub and a threaded portion next said squared portion, a driving pinion loose on this section beyond the threads thereof, a thrust bearing beyond said pinion, a disk mounted on said threads, dogs pivoted in its edge, a member slidably mounted on the squared portion and having teeth at one end adapted to engage those in the head, and a cone at its other end actuating said dogs, and means for adjusting the position of this member.

9. In a mechanism of the class described, the combination of a casing having upper and lower sections and bearings, driving and driven shafts mounted in said bearings, the bottom section of the casing being formed with a socket, a stationary, externally screw threaded post having its lower end seated in said socket and its upper end engaged with the upper section of the casing, pinions on said driven shaft, clutch devices for said pinions, a master gear having a series of toothed rings to co-act with the pinions and having a tubular hub to slide freely on the threaded portion of said post, adjustable bearing rings on the threaded portion of the post at the opposite ends of said hub for adjusting the master gear toward and from said pinions, and means for driving the master gear from the driving shaft.

10. In a mechanism of the class described, the combination with a master gear having a plurality of toothed rings, and means for rotating said gear from the power shaft; of a driven shaft extending across said gear and provided with feathers, a series of driven pinions loose on this shaft with their teeth engaging said rings, those which engage the smallest ring being on opposite sides of the center of the master gear and all their teeth being inclined, fixed thrust elements at the larger ends of all pinions, teeth projecting axially from their smaller ends, a member splined on one feather between the innermost pinions and having axial teeth at both its ends, a second member splined on the other feather and having axial teeth co-acting with those on the remaining pinion, and means for moving said members independently in either direction.

11. In a mechanism of the class described, the combination with a master gear having a plurality of toothed rings, and means for rotating said gear from the power shaft; of a driven shaft extending across said gear and provided with two feathers, a collar fast on this shaft between the feathers and other collars fast thereon at the outer ends of the feathers, three driven pinions whereof the body of each is revolubly mounted on one of said collars and provided with inclined teeth engaging the teeth of said master gear, an element fixed on the shaft at the larger end of each pinion, teeth projecting axially from the smaller end thereof, the teeth of the two innermost pinions projecting toward each other, a member splined on one feather and having teeth at its ends adapted to engage those on said innermost pinions, a second member splined on the other feather and having teeth adapted to engage those on the remaining pinion, and means for moving said members independently in either direction.

12. In a mechanism of the class described, the combination with driving and driven shaft sections, a driving pinion on the former, and several driven pinions on the driven shaft; of an upright post, a master gear journaled on said post and having several rings of teeth, a casing having a socket in which the lower end of said post is mounted and carrying bearings for said shaft sections, the upper end of the post having a two-part eye, and a cover removably secured upon said casing and having a transverse arch overlying said mechanism and eye and enlargements at the ends of the arch overlying said bearings.

13. The combination with driving and driven shaft sections, a driving pinion on the former, and a driven pinion on the driven shaft; of an upright post beneath the driven shaft, a master gear having a long hub journaled on said post, a casing having a socket in which the lower end of said post is mounted, said post being threaded and carrying a two-part eye at its upper end, bearings adjustable on the post above and below said hub, means for detachably connecting the upper part with the lower whereby the eye surrounds said shaft, and a cover detachably secured upon the casing and having a transverse arch overlying said shaft and the elements thereon and closely fitting over the upper part of the eye, for the purpose set forth.

In testimony whereof I have hereunto set my hand in presence of two subscribing witnesses.

IRA D. SPANGLER.

Witnesses:
 H. E. MATTHEWS,
 W. G. MYERS.